March 19, 1940.  V. VOORHEES  2,194,341
PNEUMATIC APPARATUS
Filed June 25, 1937
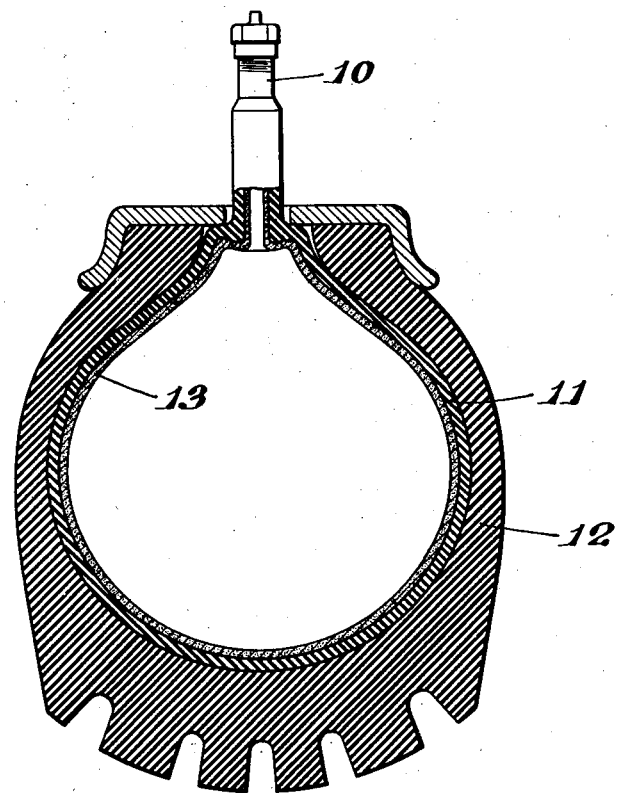
Vanderveer Voorhees
INVENTOR Patented Mar. 19, 1940

2,194,341

UNITED STATES PATENT OFFICE 2,194,341

PNEUMATIC APPARATUS

Vanderveer Voorhees, Hammond, Ind., assignor to Standard Oil Company, Chicago, Ill., a corporation of Indiana Application June 25, 1937, Serial No. 150,374

9 Claims.  (Cl. 91—68)

This invention relates to a process of treating pneumatic apparatus and particularly rubber or rubber-impregnated apparatus to prevent the escape of gases therefrom. More particularly, the invention relates to the treatment of pneumatic rubber tires, balloons, etc. to prevent the escape of gases, for example, air hydrogen, etc. contained therein. An object of the invention is to provide an economical method of coating the surfaces of rubber tires, etc. with a permanently plastic material which will seal the pores thereof and small perforations therein to prevent escape of air. Another object of the invention is to seal the surfaces of rubber containers for gases to retard the diffusion of gases therethrough. Other objects of the invention will be apparent from the following description.

The invention will be described by several examples and will be readily understood by referring to the accompanying drawing which forms a part of this specification.

One of the common problems encountered in the use of pneumatic rubber tires is the loss of air from the tires by diffusion. Occasionally, due to some slight imperfection in the tire and particularly the inner tube or air bag, the loss of air becomes especially troublesome and in these cases it is practically impossible to locate the imperfection in order to repair it.

In the operation of lighter than air craft, especially hydrogen-filled balloons made of fabric impregnated with rubber, the diffusion of the hydrogen through the integument is especially high. Various varnishes and lacquers have been used for reducing the diffusion rate, but most of them suffer from the disadvantage of inelasticity resulting in the development of minute cracks which permit the escape of gas.

I have discovered that the diffusion and escape of gases through microscopic imperfections in rubber pneumatic apparatus can be prevented by coating the surfaces thereof, and particularly the internal surfaces, with a newly developed plastic hydrocarbon resin. For this purpose I prefer to employ a resin produced by the polymerization of liquid isobutylene.

In preparing the preferred resin I treat liquid isobutylene with a polymerization catalyst, preferably a reactive metal halide of the Friedel Crafts type hydrolyzable by water. As examples of catalysts I may employ I may mention anhydrous aluminum chloride, boron trifluoride, antimony chloride, zinc chloride, tin tertachloride or mixtures thereof. The reaction may be conducted at ordinary temperature, but I prefer to operate at temperatures below 0° F. and as low as —125° F. It has been found that the lower the temperature of the reaction the more viscous the resinous product which is obtained.

In a particular example liquid isobutylene, diluted with an equal volume of hexane, was cooled to a temperature of —80° F. and $BF_3$ gas was bubbled into the cold mixture with rapid agitation. External cooling was applied to prevent the temperature rising above —50° F. and after the reaction was complete, which required about 5 to 10 minutes, the product was allowed to warm, the catalyst was removed by neutralizing and washing, and the hexane was removed from the product by evaporation. The product thus obtained is a viscous solid or semi-solid, colorless, odorless resin or gum which may vary in consistency from a doughy plastic to a sticky mass which flows slowly at room temperature. It retains its plastic nature over a wide range of temperature from 200° F. or higher down to below —100° F. without either hardening or liquefying. This plastic property is maintained over a long period of time, at least a period of years, without undergoing so-called "drying" as is common with most oils and resins. Although the resin is remarkably stable, it may become rancid on long exposure to air. This is not usually objectionable, but may be prevented by incorporating therein an antioxidant such as diphenylamine, phenyl alpha naphthylamine, aminophenol, benzyl aminophenol, catechol, guaiacol, etc. For my process I prefer to employ that form of the polymer which is tacky or sticky and which is sufficiently soft to flow very slowly at room temperature.

Among the outstanding characteristics of the isobutylene polymer prepared in this way is its substantially saturated character which renders it practically inert chemically and resistant to attack by acids, sulfur, etc. It is completely insoluble in water but dissolves readily in hydrocarbon solvents. Another characteristic which I have discovered is its resistance to diffusion, either diffusion of gases therethrough or the diffusion of the polymer itself into rubber, a property of outstanding importance in the present invention. In this respect it differs strikingly from the oils and other similar materials which have been previously employed on the surface of rubber goods. At the same time it forms a unique bond with the rubber which resists displacement therefrom and, in fact, when so displaced mechanically it automatically flows slowly again over the uncovered surface to renew the coating.

As stated, the polymer is usually colorless or only slightly yellow, has a specific gravity of about 0.9 and a molecular weight which ranges from about 1,000 to 20,000 although fractions may be separated from the product by selective solvents having somewhat higher or lower molecular weights. In general, the average molecular weight of the material will be about 1,500 to 5,000.

In applying the isobutylene polymer to pneumatic apparatus I may mechanically spread it directly on the surface, but I prefer to apply it as a solution. Thus, I may dissolve it in benzene, naphtha, carbon tetra chloride, etc. and I prefer to employ a low boiling solvent which evaporates readily from the rubber material to which it is applied. Thus, I may employ the solution in hexane directly as it is obtained from the polymerization process. I have discovered that when applying it in a solution a very uniform deposit is obtained as a result of the absorption of the solvent on the surface of the rubber article to which it is applied. Solvent absorbed in this way is found to penetrate the rubber article and finally escape by evaporation, usually from the outer surface thereof.

In applying isobutylene polymer to pneumatic tires I prefer to inject a given quantity of the viscous solution, for example a solution containing from 15 to 65% of the polymer in hexane, into the inner tube and uniformly distribute it over the inner surface thereof by mechanical action. On allowing the inner tube to stand for a few hours the solvent is found to evaporate from it, after which the inner tube may be employed in a tire without suffering from any swelling or weakening effect of the solvent on the rubber. I may also apply the solution to an inflated tire by injecting it into the inner tube, preferably through the valve stem, and depend upon the movement of the tire to obtain proper distribution. When employing this method I prefer to use somewhat more dilute solutions to obtain ready distribution over the entire surface of the inner tube. One factor which facilitates obtaining a uniform layer of the resin when applied in this way is the rapid absorption of the solvent by the rubber, which leaves the resin as a deposit on the surface thereof. The latter method of applying the material may be employed without deflating the tire or interfering with its service, in which case it may be necessary to force the resin solution into the tire by means of pressure.

The accompanying drawing shows a cross section through an automobile tire and rim and illustrates the coating of resin obtained by the foregoing method of application. The resin solution is introduced through valve stem 10 and brought into contact with the entire inner surface of the inner tube or air retaining sac 11. Solvent is rapidly absorbed from the solution by the rubber of the inner tube and also by the rubber of the tire casing 12 and eventually the solvent is dissipated from the outside surface of the casing. As rapidly as the solvent is absorbed from the resin a layer of the resin is built up on the interior of the inner tube indicated by the section 13. Being entirely enclosed, no solvent is permitted to evaporate from the resin but is entirely absorbed by the inner tube and tire and in the process of absorption the resin is carried into the minute pores of the rubber and effectively bonded therewith.

When applying the polymer to gas balloons the same methods may be used or a solution of the polymer may be sprayed on the balloon where extensive surfaces require covering. In order to prevent adhesion of coated surfaces because of the sticky nature of the resin, I may, if desired, apply a fabric, a thin layer of rubber or similar material over the resin, in which case the adhesive nature of the resin will hold it permanently in place.

As an example of the effect of the isobutylene resin in reducing the diffusion of gases through rubber pneumatic apparatus, the following data were obtained. A number of small rubber balloons were treated with a resin in the manner above described and inflated with hydrogen. The average shrinkage or reduction in diameter due to diffusion of hydrogen from the balloon for a number of treated balloons was 0.542 inch in the first hour. The untreated balloons, inflated in exactly the same manner, suffered a reduction in diameter of 0.875 inch in the same length of time. Since the rate of diffusion is directly proportionate to the change in diameter, these results show that the diffusion was 1.61, or more than 60% greater in the case of the untreated balloons than in the case of the treated balloons.

In another example of the invention a pneumatic automobile tire which had some imperfection causing a drop in the air pressure from about 30 to 20 pounds per square inch in seven days was treated with the isobutylene resin in the manner previously described by injecting a concentrated solution into the deflated inner tube and distributing mechanically over the entire interior surface thereof. After replacing the inner tube in the tire and inflating, the loss in pressure from escape of air was only about five pounds in 30 days.

Although the invention has been described in connection with certain specific applications thereof, it is intended that the scope of the invention be determined by the following claims.

I claim:

1. The process of reducing the rate of diffusion of gases through rubber pneumatic apparatus wherein said gases are retained under pressure, comprising coating the surface thereof exposed to said gases under pressure with a high molecular weight, permanently plastic, adhesive polymer of isobutylene.

2. The process of claim 1 wherein the said adhesive polymer of isobutylene possesses a molecular weight lying within the range of about 1500 to about 5000.

3. The process of claim 1 wherein the said adhesive polymer of isobutylene possesses a molecular weight lying within the range of about 1,000 to 20,000.

4. A new article of manufacture, comprising a pneumatic rubber container adapted to hold a gas under pressure and a flexible, permanently plastic coating substantially entirely covering the interior surface thereof, said coating comprising a viscous permanently plastic, adhesive, high molecular weight hydrocarbon polymer of isobutylene.

5. The process of preventing the escape of gases from pneumatic apparatus, comprising coating the interior surface thereof with a permanently plastic adhesive hydrocarbon polymer resulting from the treatment of liquid isobutylene with an active metal halide catalyst.

6. The method of retarding diffusion of hydrogen from rubber balloons which comprises coating the interior surface thereof with a permanently plastic adhesive hydrocarbon resin resulting from the polymerization of liquid isobutylene by an active metal halide catalyst.

7. The method of retarding the escape of air from pneumatic rubber tires which comprises coating the interior surface thereof with a permanently plastic adhesive hydrocarbon resin resulting from the polymerization of liquid isobutylene by an active metal halide catalyst.

8. The process of claim 7 wherein the resin is applied in the form of a solution in a volatile solvent and the solvent is absorbed in the rubber and evaporated from the external surface thereof.

9. The process of treating pneumatic rubber tires to prevent the escape of air therefrom which comprises coating the interior surface thereof with a non-volatile permanently plastic hydrocarbon adhesive polymerization product of isobutylene and distributing the said polymerization product uniformly over the interior surface of the tire by injecting a desired amount of said product into said tire in the form of a solution in a volatile solvent and bringing said solution into contact with all parts of said interior surface of said tire, whereby the solvent is absorbed into the rubber, leaving the polymerization product uniformly distributed thereon.

VANDERVEER VOORHEES.